US006788918B2

(12) United States Patent
Saitoh et al.

(10) Patent No.: US 6,788,918 B2
(45) Date of Patent: Sep. 7, 2004

(54) TRANSMISSION LINE ASSEMBLY, INTEGRATED CIRCUIT, AND TRANSMITTER-RECEIVER APPARATUS COMPRISING A DIELECTRIC WAVEGUIDE PROTUDING FOR A DIELECTRIC PLATE

(75) Inventors: Atsushi Saitoh, Muko (JP); Takeshi Okano, Kanagawa-ken (JP); Toshiro Hiratsuka, Machida (JP); Sadao Yamashita, Kyoto (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 82 days.

(21) Appl. No.: 10/045,787

(22) Filed: Jan. 14, 2002

(65) Prior Publication Data

US 2002/0093403 A1 Jul. 18, 2002

(30) Foreign Application Priority Data

Jan. 12, 2001 (JP) ....................................... 2001-005181
May 29, 2001 (JP) ....................................... 2001-160544

(51) Int. Cl.[7] .......................... H04B 1/40; H01P 1/213; H01P 3/16

(52) U.S. Cl. ......................... 455/81; 455/328; 333/239; 333/250

(58) Field of Search ................................ 333/239, 248, 333/250; 455/81, 328

(56) References Cited

U.S. PATENT DOCUMENTS 5,861,782 A * 1/1999 Saitoh ........................ 333/248
5,982,256 A * 11/1999 Uchimura et al. ...... 333/248 X
2002/0175784 A1 * 11/2002 Yamashita .................. 333/239

FOREIGN PATENT DOCUMENTS

| | | |
|---|---|---|
| DE | 1925732 A | 1/1999 |
| JP | 06-053711 | 2/1994 |
| JP | 10-075108 | 3/1998 |

OTHER PUBLICATIONS

European Search Report dated Apr. 17, 2002.

Gruner L., "Lower and Upper Bounds of Cutoff Frequencies in Metallic Waveguides", IEEE Transactions on Microwave Theory and Techniques, IEEE Inc., New York, vol. 40, No. 5, May 1, 1992, pp. 995–999, XP000271383.

Patent Abstracts of Japan, Publication No. 06053711, Publication date Feb. 25, 1994.

* cited by examiner

*Primary Examiner*—Benny Lee
(74) *Attorney, Agent, or Firm*—Dickstein, Shapiro, Morin & Oshinsky, LLP.

(57) ABSTRACT

In a transmission line assembly, a dielectric plate has a continuous protruding portion on at least one of the surfaces thereof so as to form a convex section, electrodes are formed on both of the surfaces of the dielectric plate including the outer surface of the protruding portion, and a plurality of through holes, each electrically interconnecting the electrodes formed on both of the surfaces of the dielectric plate, is arrayed on each side along the protruding portion. Accordingly, the space surrounded by the electrodes and the arrayed through holes operates as a transmission line in a mode equivalent to TE10 mode.

15 Claims, 11 Drawing Sheets

TRANSMISSION LINE ASSEMBLY, INTEGRATED CIRCUIT, AND TRANSMITTER-RECEIVER APPARATUS COMPRISING A DIELECTRIC WAVEGUIDE PROTUDING FOR A DIELECTRIC PLATE

BACKGROUND OF THE INVENTION

1. Field of the Invention

The present invention relates to a transmission line assembly in which a transmission line is formed on a dielectric plate, an integrated circuit incorporating the transmission line assembly, and a transmitter-receiver apparatus incorporating the integrated circuit, such as a radar apparatus or a communications apparatus.

2. Description of the Related Art

Hitherto, integration of a waveguide transmission line with a dielectric substrate has been proposed in (1) Japanese Unexamined Patent Application Publication No. 6-53711 and (2) Japanese Unexamined Patent Application Publication No. 10-75108.

In a waveguide transmission line assembly according to (1), in a dielectric substrate having two or more conductor layers, two lines of through holes are provided, each line having a plurality of through holes electrically interconnecting the conductor layers, so that the space between the two interconnected conductor layers and the two lines of through holes operate as a waveguide (a dielectric-filled waveguide). In a dielectric waveguide line and a wiring board according to (2), in addition to the construction described above, conductor sub-layers electrically connected to the through holes are formed between the two main conductor layers, and outside the lines of through holes.

However, in both (1) and (2), the through holes arranged in planes which extend in a direction perpendicular to the waveguide (and each hole being arranged perpendicular to the plane of the dielectric substrate), are the only current paths which operate as walls; thus, current concentrates in the through holes, resulting in the problem of increased conductor loss. Furthermore, the through holes formed in the direction perpendicular to the plane of the dielectric substrate allow current to flow only in the direction perpendicular to the dielectric substrate, and do not allow current to flow in the diagonal direction, resulting in the problem that the transmission characteristics are not as good as compared to a common waveguide or a dielectric-filled waveguide.

SUMMARY OF THE INVENTION

The present invention provides a transmission line assembly, an integrated circuit incorporating the transmission line assembly, and a transmitter-receiver apparatus incorporating the integrated circuit, such as a radar apparatus or a communications apparatus, which serves to improve productivity by forming a waveguide transmission line on a dielectric plate, in which integration with a wiring board is achieved, and which serve to improve transmission characteristics.

To this end, the present invention, in one aspect thereof, provides a transmission line assembly including a dielectric plate having a continuous protruding portion on at least one of the surfaces thereof so as to form a convex section; electrodes formed on both of the surfaces of the dielectric plate including the outer surface of the protruding portion; and a plurality of through holes arrayed on each side along the protruding portion, each electrically interconnecting the electrodes formed on both of the surfaces of the dielectric plate. Accordingly, a waveguide transmission line with a low transmission loss can be implemented using a dielectric plate, and furthermore, an apparatus in which components are mounted on a flat surface of a dielectric plate can be readily implemented.

Preferably, in the transmission line assembly, the protruding portion on a dielectric substrate is formed of a dielectric material having a dielectric constant larger than that of the dielectric plate, serving to reduce loss associated with radiation from through holes, so that a dielectric waveguide with small loss, high reliability, and small in size can be readily implemented.

Preferably, in the transmission line assembly, if the dielectric constant of the protruding portion and a region surrounded by a plurality of through holes in a dielectric plate is made larger than that of the other regions, the distribution of magnetic field in the waveguide portion becomes further concentrated, serving to implement a dielectric waveguide with small loss.

In the transmission line assembly, the distance between the electrodes at the protruding portion in the thickness direction of the dielectric plate is preferably at least as long as half the wavelength in the dielectric plate at the operating frequency. Accordingly, unwanted transmission modes can be effectively suppressed.

Further, in the transmission line assembly, the pitch of the plurality of through holes in the direction along the protruding portion is preferably not longer than half the wavelength in the dielectric plate at the operating frequency. Accordingly, unwanted transmission modes can be further suppressed.

Furthermore, in the transmission line assembly, the distance between the two pluralities of through holes in the direction across the protruding portion is not longer than the wavelength in the dielectric plate at the operating frequency. Accordingly, mode transformation to the parallel-plate mode is inhibited at the operating frequency, and loss associated therewith is eliminated, so that a transmission line with an even lower loss is achieved.

More preferably, the distance between the electrodes at the protruding portion in the thickness direction of the dielectric plate is not longer than the wavelength in the dielectric plate at the operating frequency, and the width of the protruding portion and the distance between the pluralities of through holes in the direction across the protruding portion are not longer than half the wavelength in the dielectric plate at the operating frequency. Accordingly, transmission in a single mode is achieved in the operating frequency range, preventing loss associated with transformation of mode at the bend portion and improving flexibility of layout pattern of a transmission line.

Furthermore, the corners of the protruding portion are preferably rounded. Accordingly, concentration of current at the edges of the electrodes can be alleviated, further reducing conductor loss.

Furthermore, the protruding portion is preferably tapered so as to get narrower away from the dielectric plate. Accordingly, productivity of transmission lines can be improved and cost can be reduced.

The present invention, in another aspect thereof, provides an integrated circuit including a transmission line assembly defined above; and a plurality of transmission lines formed or electronic components mounted on the dielectric plate in the transmission line assembly. Accordingly, loss can be reduced, and in particular, by making one of the surfaces of the dielectric plate flat, formation of transmission lines using conductor patterns and mounting of electronic components can be facilitated.

In the integrated circuit, the base material of the dielectric plate is preferably a ceramic material. Accordingly, mounting of surface-mount components by simultaneous reflow soldering is allowed, improving productivity and thus reducing cost.

The present invention, in yet another aspect thereof, provides a transmitter receiver apparatus including an integrated circuit defined above, a transmission line thereof being used to transmit a transmission signal and a reception signal; an oscillator; and a mixer. Accordingly, power consumption can be reduced and sensitivity can be improved.

Other features and advantages of the present invention will become apparent from the following description of embodiments of invention which refers to the accompanying drawings.

DETAILED DESCRIPTION OF PREFERRED EMBODIMENTS OF THE INVENTION

Figure 1A:
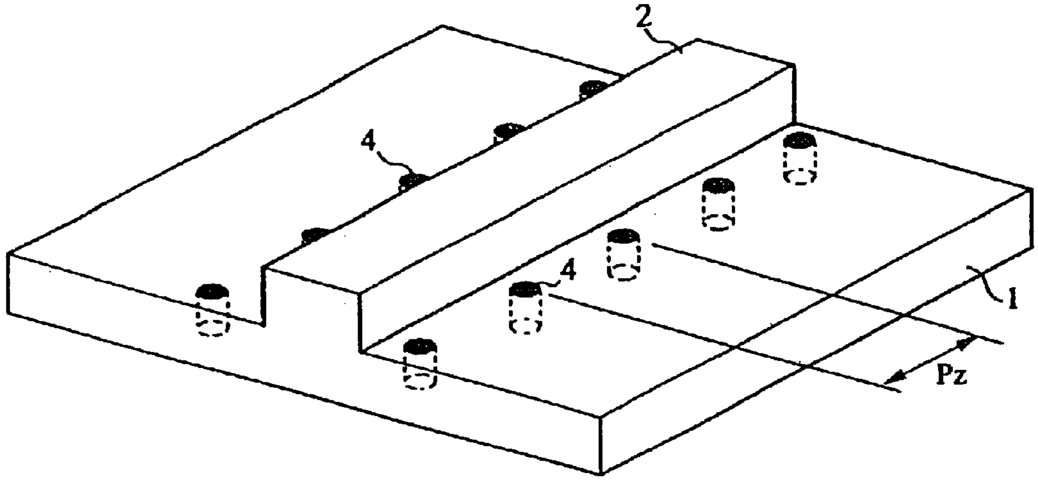
FIGS. 1A and 1B are, respectively, a perspective view and a sectional view showing the construction of a transmission line assembly according to a first embodiment.

The construction of a transmission line assembly according to a first embodiment will be described with reference to FIGS. 1A and 1B, FIGS. 2A and 2B, and FIGS. 3A to 3C. Throughout this specification and drawings, the same element is designed by the same reference numeral unless otherwise indicated.

Figure 1B:
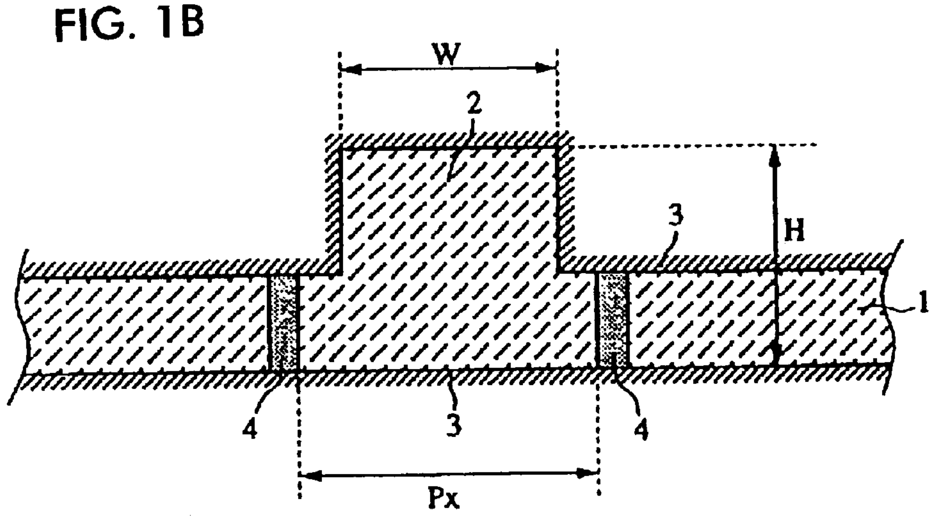

FIG. 1A is a perspective view of the transmission line assembly, and FIG. 1B is a sectional view thereof. Referring to FIGs. 1A and 1B, a dielectric plate 1 has a continuous protruding portion 2, so that a section of the dielectric plate 1 taken perpendicularly to the extending direction of the protruding portion 2 is convex. On both of the surfaces of the dielectric plate 1, including the outer surface (the side surfaces and the top surface) of the protruding portion 2, electrodes 3 (see FIG. 1B) are formed. Furthermore, along the extending direction of the protruding portion 2, a plurality of through holes 4, each electrically interconnecting the electrodes 3 formed on both of the surfaces of the dielectric plate 1, is arrayed on both sides of the protruding portion 2. As shown in FIG. 1B, the width W of the protruding portion 2 is not longer than half the wavelength in the dielectric plate 1 at the operating frequency, and the height H from the bottom surface of the dielectric plate 1 to the top surface of the protruding portion 2 is at least as long as half the wavelength in the dielectric plate 1 at the operating frequency.

Figure 2A:
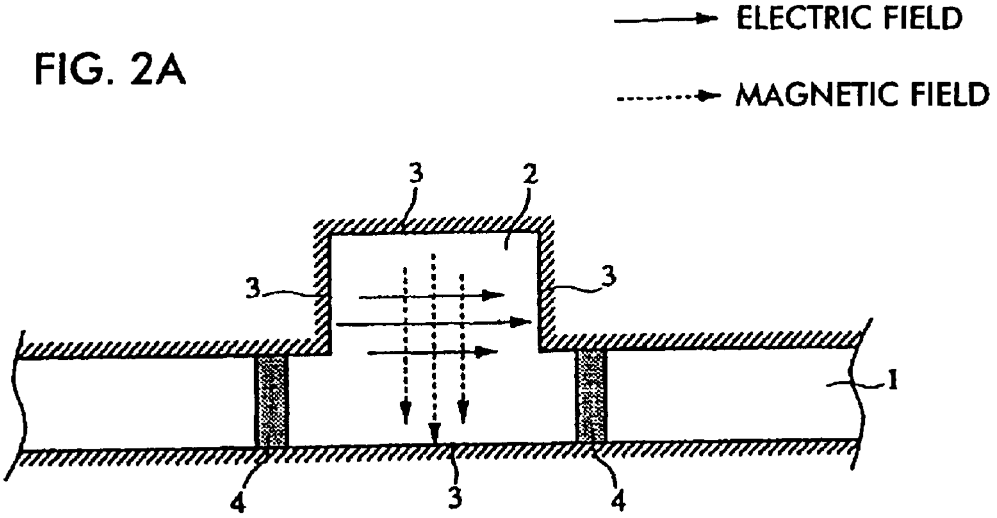
FIGS. 2A and 2B are diagrams showing an example of distribution of an electromagnetic field in the transmission line assembly.
Figure 2B:
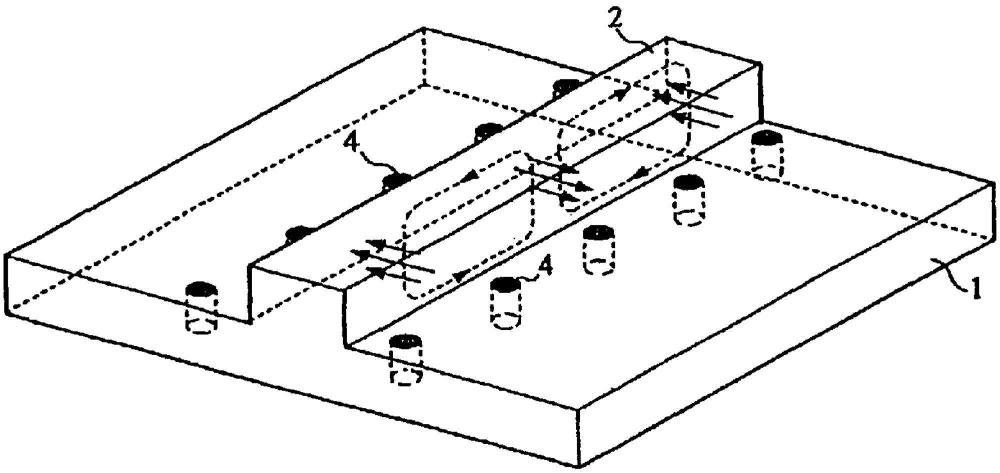

FIG. 2A shows the distribution of an electromagnetic field at a section in a plane perpendicular to the extending direction of the protruding portion 2, and FIG. 2B shows the distribution of an electromagnetic field in a perspective view of the transmission line assembly.

According to this construction, as depicted in FIGS. 2A, 2B, the plurality of arrayed through holes 4 equivalently forms side walls of a waveguide, so that electromagnetic waves propagate in a mode equivalent to TE10 mode with the two opposing side surfaces of the protruding portion 2 as H planes and the top surface of the protruding portion 2 and the bottom surface of the dielectric plate 1 as E planes.

Figure 3A:
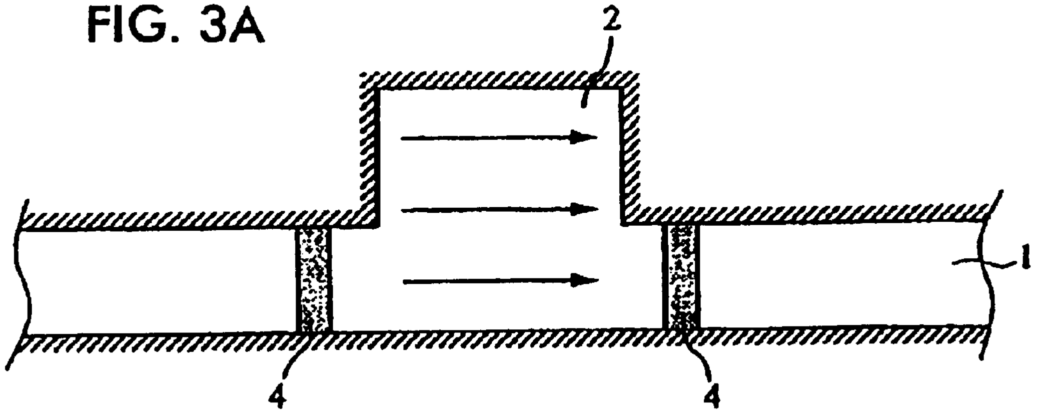
FIGS. 3A, 3B, and 3C are diagrams showing electric field vectors in the transmission line assembly in detail.
Figure 3B:
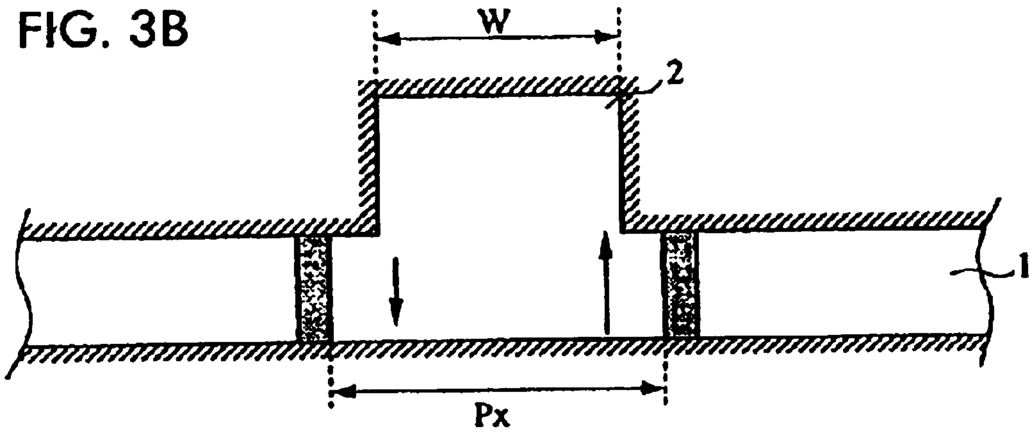
Figure 3C:
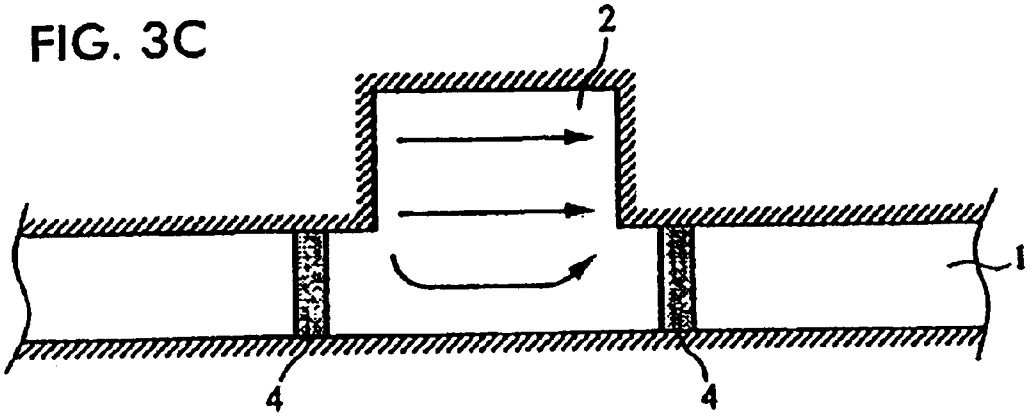

FIGS. 3A to 3C show the electric field vectors in the transmission line with particular consideration of the thickness portion of the dielectric plate 1 outside of the protruding portion 2. FIG. 3A shows electric field vectors in the direction perpendicular to the direction of propagation of electromagnetic waves and parallel to the direction of the plane of the dielectric plate 1. FIG. 3B shows electric field vectors in the direction perpendicular to the direction of propagation of electromagnetic waves and perpendicular to the plane of the dielectric plate 1. The transmission line can be considered as a superposition of the electric field vectors shown in FIG. 3A and the electric field vectors shown in FIG. 3B. Thus, the combined electric vectors can be represented as shown in FIG. 3C.

The mode which has the electric vectors shown in FIG. 3B is a higher mode of a parallel-plate mode, and this mode causes radiation loss. The cutoff frequency of the mode is determined by the distance Px between the two lines of the arrayed through holes and the constant of the dielectric plate 1. Thus, if the wavelength in the dielectric plate 1 in the operating frequency range is represented by $\lambda$, transformation to the unwanted parallel-plate mode can be inhibited in the operating frequency range by setting $Px<\lambda$. Also, by setting the pitch of the through holes 4 in the direction of propagation of electromagnetic waves (Pz in FIG. 1A) not longer than half the wavelength in the dielectric plate 1 in the operating frequency range, excitation of a parallel-plate mode is prevented, and thus radiation loss due to the operating propagation mode being transformed to the parallel-plate mode is prevented.

That is, in order to inhibit transformation to the parallel-plate mode, if the width W (see FIG. 3B) of the protruding portion is half the wavelength, the distance from the side surfaces of the protruding portion to the through holes must be set not longer than a quarter of the wavelength.

By setting the distance H between the electrodes in the thickness direction of the dielectric plate 1 at the portion where the protruding portion 2 shown in FIG. 1B is formed not shorter than half the wavelength and not longer than the wavelength in the dielectric plate 1 at the operating frequency, and the width W of the protruding portion 2 and the distance between the through holes 4 not longer than half the wavelength, the mode which is perpendicular to the operating mode will be the cutoff condition, so that transmission in a single mode equivalent to TE10 mode is achieved. Thus, even if a bend portion is provided in the protruding portion 2, loss due to transformation of mode and loss due to spurious response are prevented.

Figure 4A:
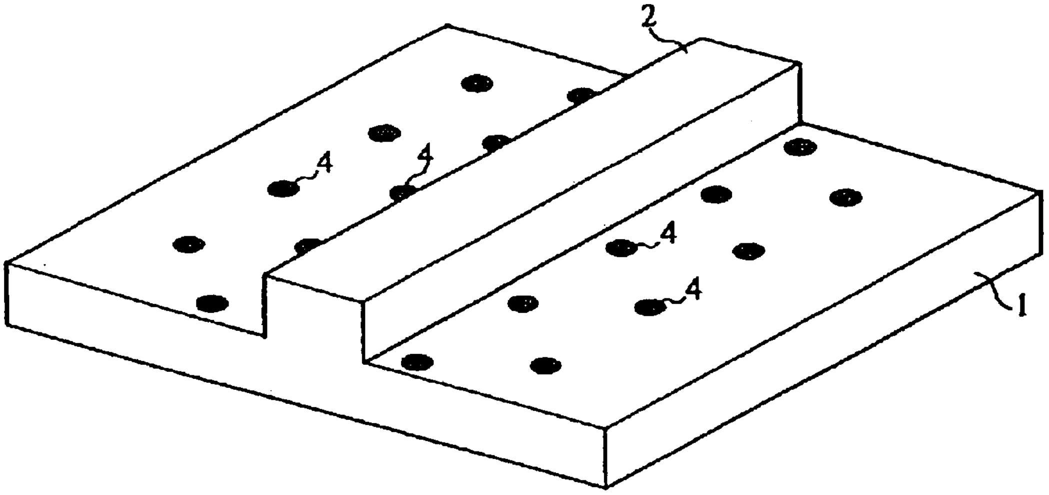
FIGS. 4A and 4B are perspective views of transmission line assemblies according to a second embodiment.
Figure 4B:
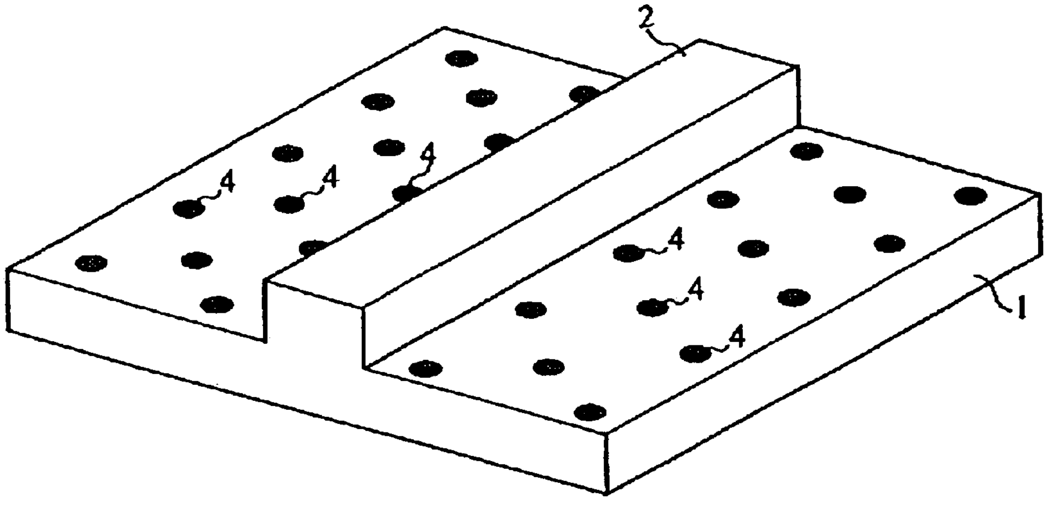

Next, the construction of transmission line assemblies according to a second embodiment is shown in FIGS. 4A and 4B. As opposed to the first embodiment in which the two lines of through holes opposing each other are arrayed on both sides along the protruding portion formed on the dielectric plate, a plurality of lines of through holes is provided on each side of the protruding portion 2 in the second embodiment. In the example shown in FIG. 4A, two lines of through holes 4 are arrayed in a staggered pattern on each side along the protruding portion 2. In the example shown in FIG. 4B, three lines of through holes 4 are arrayed on each side along the protruding portion 2, also in a staggered pattern. By multiplexing the lines of through holes as described above, radiation of a parallel-plate mode propagating through the dielectric plate from the transmission line to the outside or from the outside to the transmission line can be further suppressed.

Next, the construction of a transmission line assembly according to a third embodiment will be described with reference to FIGS. 5 and FIGS. 6A to 6C.

Figure 5:
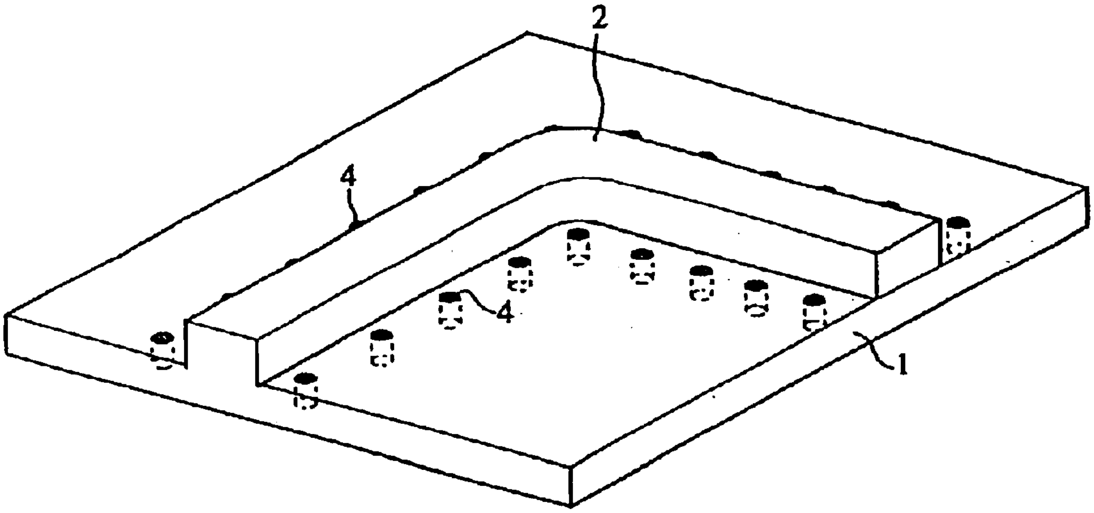
FIG. 5 is a perspective view of a transmission line assembly according to a third embodiment.

FIG. 5 is a perspective view of the transmission line according to the third embodiment. In this embodiment, a protruding portion 2 having a bend structure is formed on a dielectric plate 1, and through holes 4 are arrayed on both sides along the protruding portion 2.

Figure 6A:
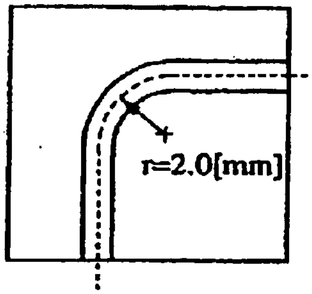
FIGS. 6A and 6B, are diagrams showing dimensions of each portion
Figure 6B:
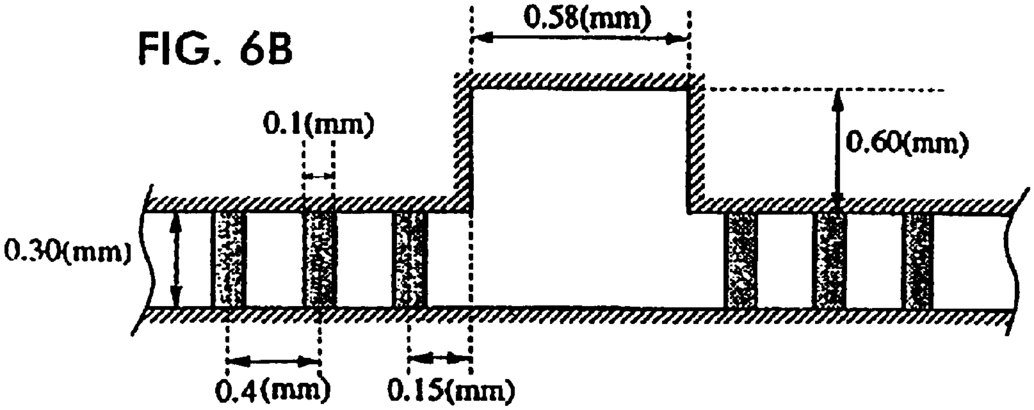

FIGS. 6A and 6B show specific dimensions of each portion and transmission characteristics of the transmission line. The relative constant of the dielectric plate is 7.0, the radius r of the line center of the bend portion is 2.0 mm, as shown in FIG. 6A, the diameter of the through holes 4 is 0.1 mm, the pitch of the through holes 4 is 0.4 mm, the width of the protruding part 2 is 0.58 mm and it extends upward 0.60 mm above a 0.30 thick mm plate 1, with the center of the closest hole 4 being 0.15 mm away from its side wall, as shown in FIG. 6B, so that three lines of through holes 4 on each side, i.e., six lines in total, are formed.

Figure 6C:
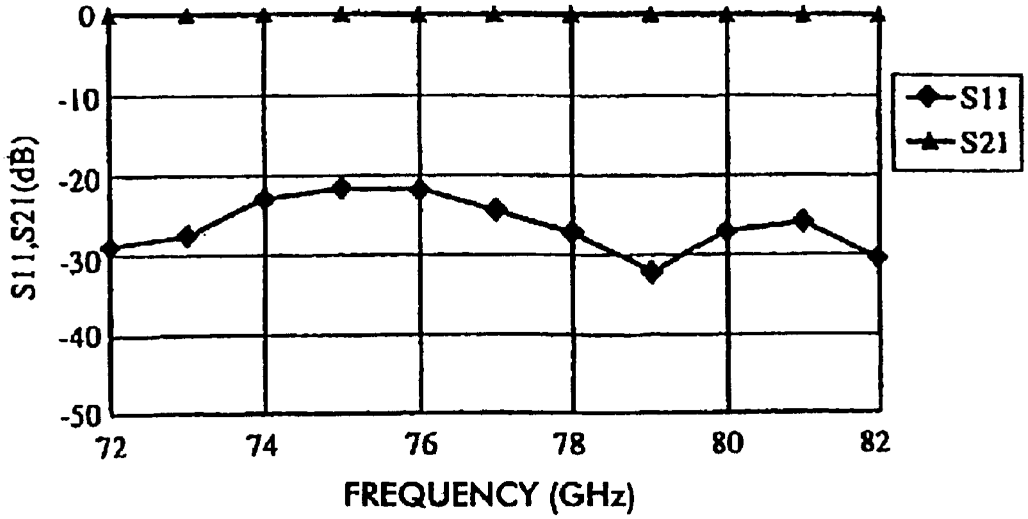
FIG. 6C is an example of transmission characteristics of the transmission line assembly.

FIG. 6C shows S11 and S21 characteristics in the above conditions. Even if a bend with a small curvature radius is provided as described above, by making the transmission line operate in a single mode equivalent to TE10 mode, low insertion loss and low reflectivity can be achieved.

Figure 7:
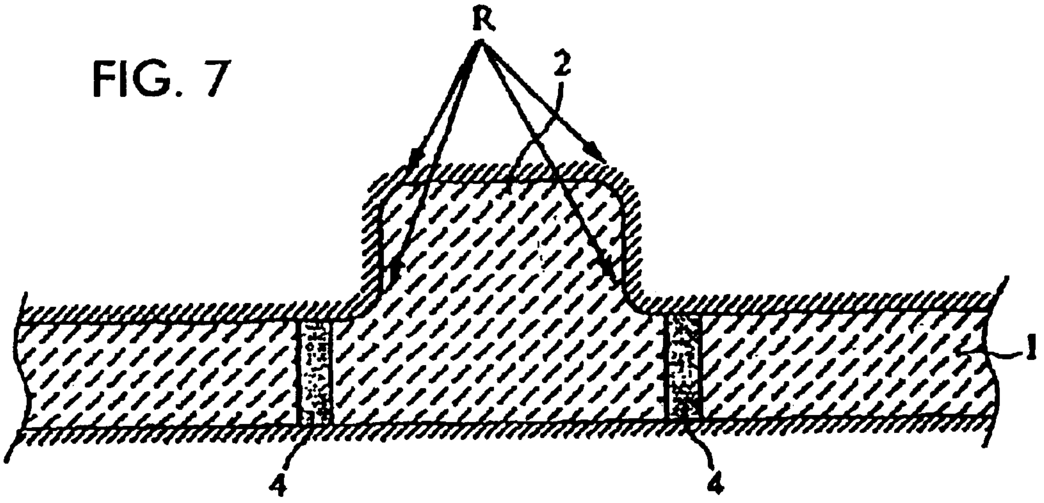
FIG. 7 is a sectional view of a transmission line assembly according to a fourth embodiment.

Next, a sectional view of the construction of a transmission line assembly according to a fourth embodiment is shown in FIG. 7. In this embodiment, the corners of a protruding portion 2 formed on a dielectric plate 1 are rounded as indicated by R. According to this structure, concentration of current at the edges of electrodes is alleviated to reduce conductor loss, achieving low insertion loss.

The protruding portion of the transmission line shown in FIG. 7 can be formed by the sandblasting method, for example.

Figure 8:
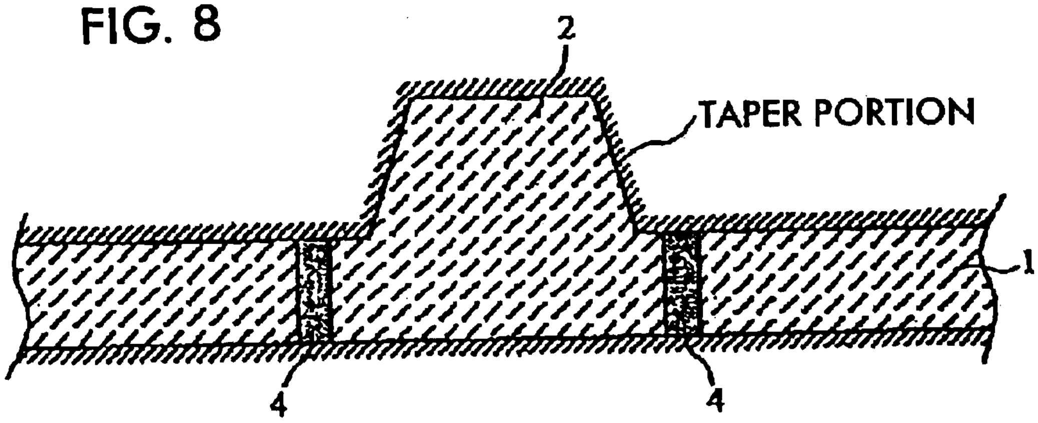
FIG. 8 is a sectional view of a transmission line assembly according to a fifth embodiment.

FIG. 8 is a sectional view of a transmission line assembly according to a fifth embodiment. In this embodiment, a protruding portion 2 having a convex section is formed on a dielectric plate 1, the protruding portion 2 being tapered so as to get narrower away from the dielectric plate 1. The dielectric plate having the protruding portion as above improves releasability of the dielectric plate from a metallic mold after forming the dielectric plate in a metallic mold and/or by an injection molding process, thus improving productivity.

The construction of a dielectric waveguide according to a sixth embodiment will be described with reference to FIGS. 9A and 9B and FIGS. 10A to 10D.

Figure 9A:
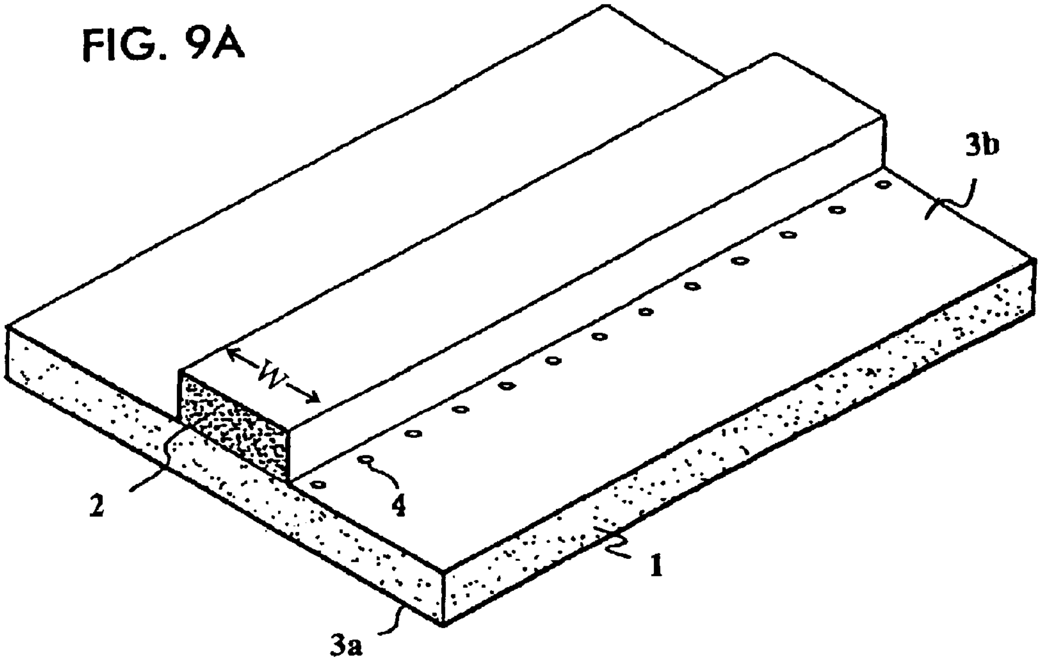
FIGS. 9A and 9B are, respectively, a perspective view and a sectional view showing the construction of a transmission line assembly according to a sixth embodiment.
Figure 9B:
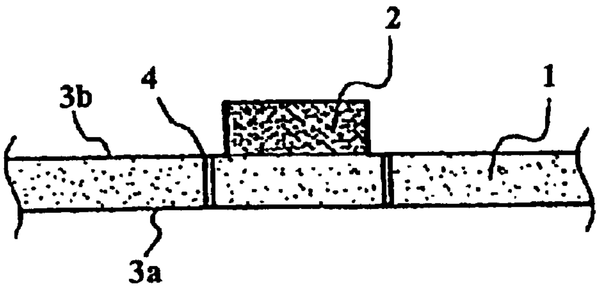

FIG. 9A is a perspective view of the dielectric waveguide, and FIG. 9B is a sectional view thereof, taken on a plane perpendicular to the extending direction of a protruding portion.

FIGS. 10A, 10B, 10C, 10D are sectional views of the dielectric waveguide at different manufacturing steps.

Referring to FIGS. 9A and 9B, reference number 1 indicates a dielectric substrate, 2 indicates a protruding portion, 3*a* indicates a bottom-surface electrode, 3*b* indicates a top-surface electrode, 4 indicate through holes, and in FIGS. 10A to 10D, 101 and 110 indicate dielectric sheets, and 104 indicate perforated holes.

Referring to FIGS. 9A and 9B, on a portion of the dielectric substrate 1, the continuous protruding portion 2 is formed, so that a section taken along the direction perpendicular to the extending direction of the protruding portion 2 is convex in shape. On the surface of the dielectric substrate 1 on which the protruding portion 2 is formed, including the outer surface (the side surfaces and the top surface) of the protruding portion 2, the top-surface electrode 3*b* is formed, and substantially the entire other surface of the dielectric substrate 1 is covered with the bottom-surface electrode 3*a*. Furthermore, on both sides of the protruding portion 2 along the extending direction thereof, a plurality of through holes 4, electrically interconnecting the top-surface electrode 3*b* and the bottom-surface electrode 3*a* formed on both surfaces of the dielectric substrate 1, is formed in an array. The protruding portion 2 is formed of a dielectric material having a larger dielectric constant than that of the dielectric substrate 1.

The width W of the protruding portion 2 is not longer than half the wavelength in the dielectric at the operating frequency, and the height from the bottom surface of the dielectric substrate 1 to the top surface of the protruding portion 2 is not shorter than half the wavelength in the dielectric at the operating frequency.

According to the construction, the array of through holes 4 equivalently forms walls of the waveguide, so that electromagnetic waves propagate in a mode equivalent to TE10 mode with the two opposite side surfaces of the protruding portion 2 as H planes and the top surface of the protruding portion 2 and the bottom surface of the dielectric substrate 1 as E planes.

Furthermore, because the dielectric constant of the dielectric material forming the protruding portion 2 is larger than that of the dielectric substrate 1, the height of the dielectric waveguide can be reduced compared with a case where the protruding portion 2 is formed of a dielectric material having the same dielectric constant as that of dielectric substrate 1. Furthermore, because the electric field and the magnetic field concentrate on the protruding portion 2, radiation from the through holes 4 in the dielectric substrate 1 can be reduced. Accordingly, a dielectric substrate with small loss and small size can be implemented.

Furthermore, although the through holes 4 are formed on the dielectric substrate 1, because the dielectric constant of the dielectric substrate 1 is smaller than that of the protruding portion 2, the pitch between the through holes 4 can be increased compared with a case where the dielectric substrate 1 is formed of a dielectric material having the same dielectric constant as that of the protruding portion 2. Accordingly, a dielectric waveguide with high reliability and small in size can be implemented.

Next, an example of a method of manufacturing the dielectric waveguide will be described with reference to FIGs. 10A to 10D.

Figure 10A:
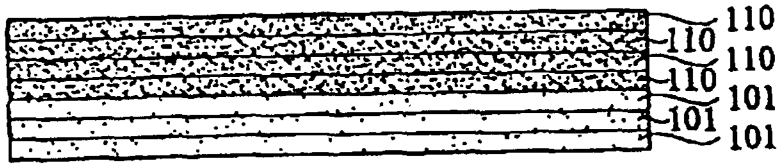
FIGS. 10A, 10B, 10C and 10D are sectional views of the dielectric waveguide at different manufacturing steps according to a sixth embodiment.

First, the plurality of dielectric sheets 101 and 110 are laminated, as shown in FIG. 10A. The dielectric sheets 110 are formed of a material having a dielectric constant larger than that of the dielectric sheets 101. The combination of dielectric materials may be chosen as desired as long as the above condition for dielectric constants is satisfied.

Then, the whole body is fired at a predetermined temperature in order to bond the dielectric sheets, whereby an integrated dielectric substrate is formed.

Figure 10B:
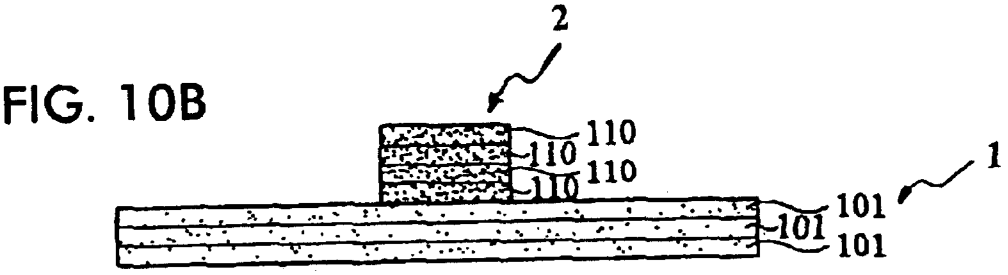

Then, only the dielectric sheets 110 having a larger dielectric constant are cut to a predetermined width, for example, by sandblasting, so that the continuous protruding portion 2 is formed, whereby a convex section as shown in FIG. 10B is formed.

Figure 10C:
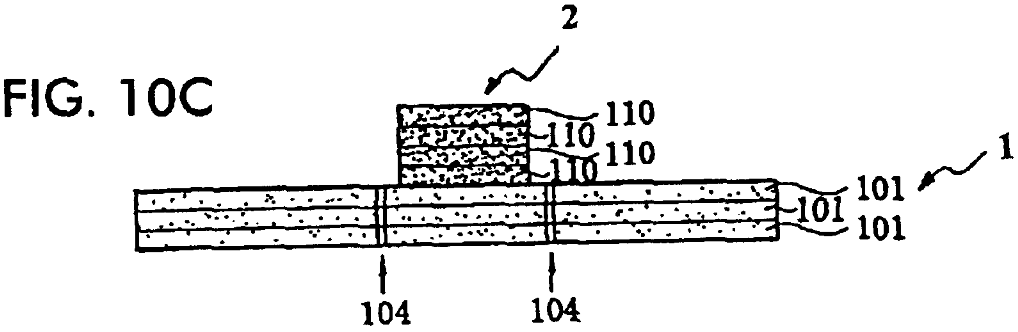

Next, as shown in FIG. 10C, on both sides of the protruding portion 2 formed of the dielectric sheets 110, the plurality of perforated holes 104 which runs through the dielectric substrate 1 formed of the plurality of laminated dielectric sheets 101 is formed at a predetermined pitch in parallel to the extending direction of the protruding portion 2.

Figure 10D:
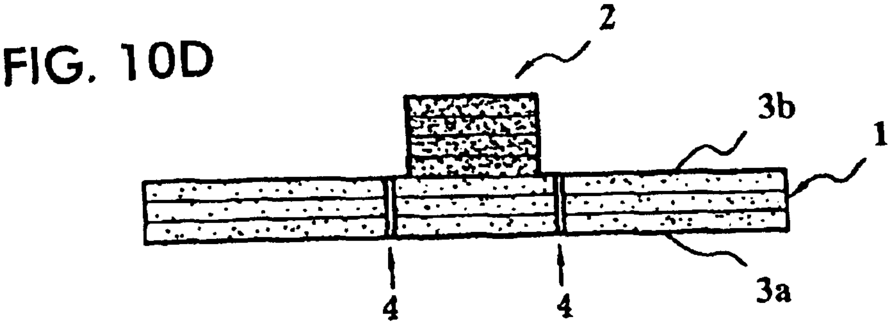

Then, as shown in FIG. 10D, the top-surface electrode 3*b* is formed on one of the surfaces of the dielectric substrate 1 including the side surfaces and the top surface of the protruding portion 2, and the bottom-surface electrode 3*a* is formed on the other surface of the dielectric substrate 1. Furthermore, inner-surface electrodes are formed on the inner surfaces of the perforated holes 104 (see FIG. 10C), whereby the through holes 4 (see FIG. 10D) electrically interconnecting the top-surface electrode 3*b* and the bottom-surface electrode 3*a* are formed.

As described above, the dielectric waveguide is formed simply by laminating and cutting the dielectric sheets and forming the electrodes. Thus, the dielectric waveguide can be readily manufactured simply by using processes for manufacturing ordinary laminated substrates.

The manufacturing steps need not necessarily be in the above-described order, and the order may be changed.

Next, the construction of a dielectric waveguide according to a seventh embodiment will be described with reference to FIGS. 11A and 11B.

Figure 11A:
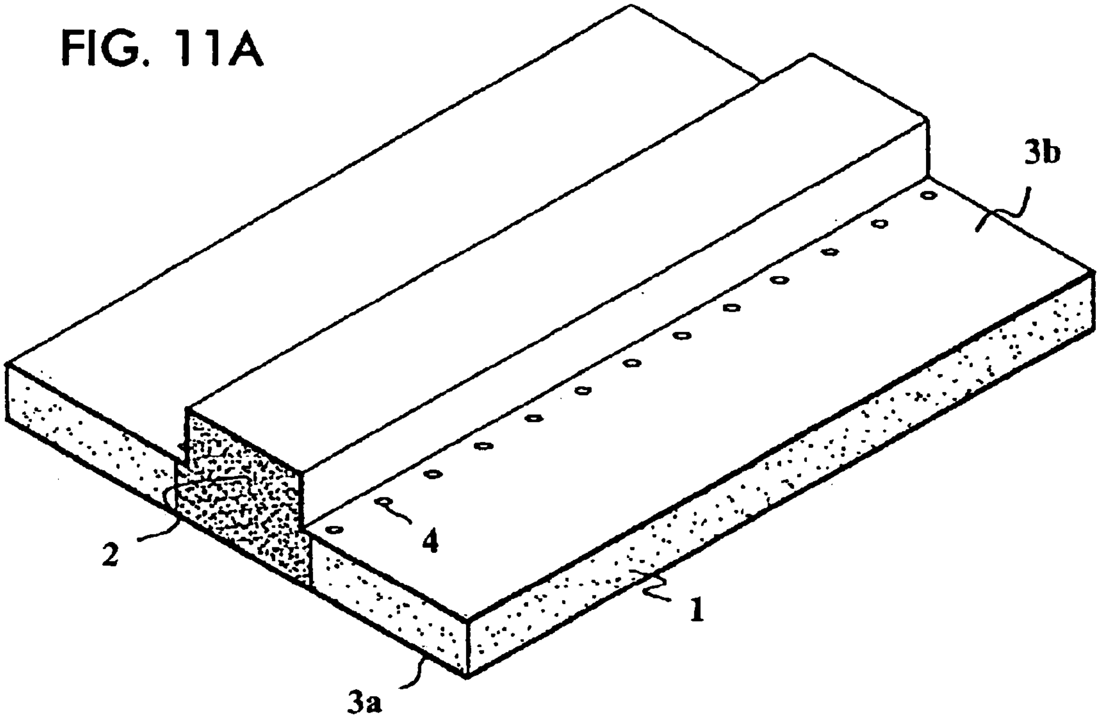
FIGS. 11A and 11B are, respectively, a perspective view and a sectional view showing the construction of a transmission line assembly according to a seventh embodiment.
Figure 11B:
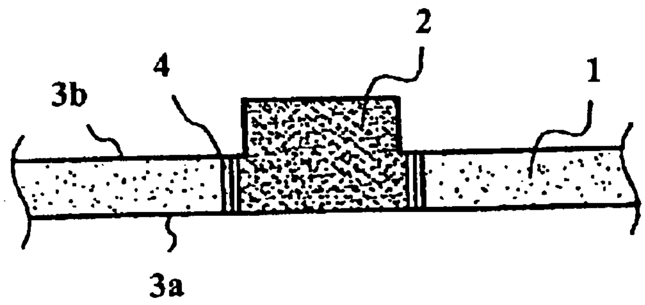

FIG. 11A is an external perspective view of the dielectric waveguide, and FIG. 11B is a sectional view thereof, taken on a plane perpendicular to the extending direction of a protruding portion.

Referring to FIGS. 11A and 11B, reference number 1 indicates a dielectric substrate, 2 indicates a protruding portion, 3*a* indicates a bottom-surface electrode, 3*b* indicates a top surface electrode, and 4 indicate through holes.

In the dielectric waveguide shown in FIGS. 11A and 11B, the dielectric constant of the protruding portion 2 and a region on the dielectric substrate 1 surrounded by the plurality of through holes 4 is made larger than that of the other regions. The construction of the dielectric waveguide is otherwise the same as that of the dielectric waveguide shown in FIGS. 9A and 9B.

The dielectric waveguide of the above construction is formed by bonding two dielectric substrates having different dielectric constants, and forming the plurality of through holes 4 along the junction. That is, the first region having a high dielectric constant, including the protruding portion 2 and the region of the dielectric substrate 1 to be surrounded by the plurality of through holes 4, and the second regions having a dielectric constant smaller than that of the first region, are separately formed and then bonded, and the plurality of through holes 4 is formed along the junction, whereby the dielectric waveguide is formed.

According to the construction described above, because the dielectric constant of the region surrounded by the plurality of through holes 4 is larger than that of the other regions, the distribution of electromagnetic field becomes more concentrated, lowering the density of magnetic field in the proximity of conductor walls, whereby loss associated with the conductor walls is reduced.

Next, as an example of an integrated circuit and a transmitter-receiver apparatus incorporating the same, the construction of a radar apparatus will be described with reference to FIGS. 12 and 13.

Figure 12:
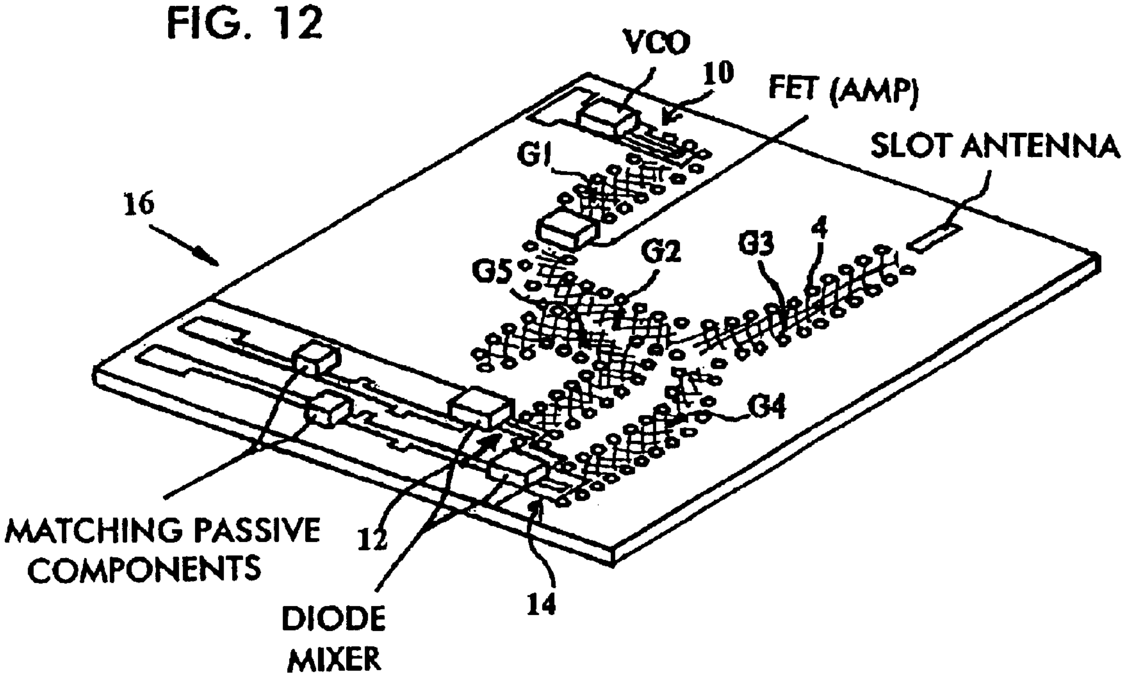
FIG. 12 is an illustration showing the construction of an integrated circuit and a radar apparatus according to a sixth embodiment.
Figure 13:
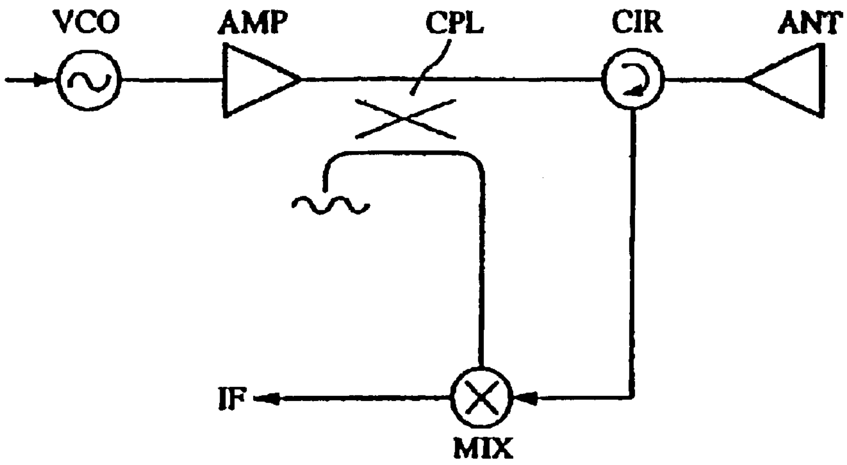
FIG. 13 is a block diagram of the radar apparatus.

FIG. 12 is a perspective view of a dielectric plate seen from the side on which electronic components are mounted, and FIG. 13 is an equivalent circuit diagram of the radar apparatus. The dielectric plate has continuous protruding portions (not shown) on the bottom side thereof as viewed in FIG. 12 so as to have a convex cross-section. Furthermore, electrodes are formed on both of the surfaces of the dielectric plate, and a plurality of through holes 4 is arrayed on both sides along the protruding portions, whereby transmission lines are formed.

Although the protruding portion is not apparent in FIG. 12, which shows the side on which electronic components are mounted, the layout of the transmission lines can be recognized from the array pattern of the through holes 4. That is, broadly, five transmission lines indicated by G1, G2, G3, G4, and G5 are formed.

On the top surface of the dielectric plate 1 as viewed in the figure, a voltage-controlled oscillator (VCO) is connected to a coplanar line 10. The coplanar line 10 is coupled to the transmission line indicated by G1. Between the transmission lines G1 and G2, an amplifier circuit (AMP) implemented by an FET is provided. Furthermore, at an end of the transmission line G3, a slot antenna is formed, so that a transmission signal is radiated from the slot antenna in the direction perpendicular to the dielectric plate. The adjacent portions of the transmission lines G2 and G5 constitute a directional coupler. A signal which is distributed by the directional coupler is coupled as a local signal to a coplanar line 12 which is connected to one of the diodes of a mixer circuit. Furthermore, a circulator is formed at the Y-branched center of the transmission lines G2, G3, and G4. The circulator is constructed of a resonator implemented by a disk-shaped ferrite plate and a permanent magnet applying a static magnetic field to the ferrite plate in the perpendicular direction. Via the circulator, a reception signal from the slot antenna is coupled to a coplanar line 14 which is connected to the other diode of the mixer circuit. The two diodes of the mixer circuit operate as a balanced mixer circuit, and the output thereof is fed to an external circuit via a balanced line 16 having matching passive components in the middle.

FIG. 13 is a block diagram of the radar apparatus. Referring to FIG. 13, an oscillation signal from the VCO is amplified by the amplifier AMP, and then fed as a transmission signal to the antenna ANT via the directional coupler CPL and the circulator CIR. The reception signal from the circulator CIR and the local signal from the directional coupler CPL are fed to the mixer MIX, and the mixer outputs an intermediate frequency signal IF.

By using a transmission line with low transmission loss as described above, power efficiency is improved, achieving a radar apparatus with low power consumption and a high target detecting ability.

Although a radar apparatus is used as an example in the above description, a communications apparatus can be implemented in a similar manner, which transmits a transmission signal to a communications apparatus of another party and which receives a transmission signal from the communications apparatus of another party.

Although the present invention has been described in relation to particular embodiments thereof, many other variations and modifications and other uses will become apparent to those skilled in the art. Therefore, the present invention is not limited by the specific disclosure herein.

What is claimed is:

1. A transmission line assembly for transmission of signals at a given operating frequency, comprising:

a dielectric plate having two surfases and a continuous protruding portion on one of the surfaces thereof so as to define a convex section and no continuous protruding portion on the surface opposite thereto;

electrodes disposed on both of said surfaces of said dielectric plate including the surface of said protruding portion; and a plurality of through holes arrayed on both sides along said protruding portion, each said through hole electrically interconnecting said electrodes disposed on both of the surfaces of said dielectric plate.

2. A transmission line assembly according to claim 1, wherein the dielectric constant of the protruding portion is larger than the dielectric constant of the remaining part of the dielectric plate.

3. A transmission line assembly according to claim 1, wherein the dielectric constant of the protruding portion and a region on the dielectric plate surrounded by the plurality of through holes is larger than the dielectric constant of the remaining part of the dielectric plate.

4. A transmission line assembly according to claim 1, wherein the distance between said electrodes at said protruding portion in the thickness direction of said dielectric plate being at least as long as half the wavelength in said dielectric plate at said operating frequency.

5. A transmission line assembly according to claim 4, wherein the distance between said electrodes at said protruding portion in the thickness direction of said dielectric plate is not longer than the wavelength in said dielectric plate at said operating frequency, and the width of said protruding portion and the distance between said plurality of through holes in the direction across said protruding portion are not longer than half the wavelength in said dielectric plate at said operating frequency.

6. A transmission line assembly according to claim 1, wherein the distance between said plurality of through holes in the direction across said protruding portion is not longer than the wavelength in said dielectric plate at said operating frequency.

7. A transmission line assembly according to claim 1, wherein the pitch of said plurality of through holes in the direction along said protruding portion is not longer than half the wavelength in said dielectric plate at said operating frequency.

8. A transmission line assembly according to claim 1, wherein said protruding portion has corners which are rounded.

9. A transmission line assembly according to claim 1, wherein said protruding portion is tapered so as to be narrower away from said dielectric plate.

10. An integrated circuit comprising:

a transmission line assembly according to claim 1; and a plurality of additional transmission lines disposed on the dielectric plate in said transmission line assembly.

11. An integrated circuit according to claim 10, wherein said dielectric plate comprises a ceramic material.

12. A transmitter-receiver apparatus comprising:

an integrated circuit according to claim 10, a transmission line thereof being used to transmit a transmission signal and a reception signal;

an oscillator; and a mixer.

13. An integrated circuit comprising:

a transmission line assembly according to claim 1; and a plurality of electronic components mounted on the dielectric plate in said transmission line assembly.

14. A transmitter-receiver apparatus comprising:

an integrated circuit according to claim 13, a transmission line thereof being used to transmit a transmission signal and a reception signal;

an oscillator; and a mixer.

15. An integrated circuit according to claim 13, wherein said dielectric plate comprises a ceramic material.

* * * * *